(12) United States Patent
Davies

(10) Patent No.: US 11,236,678 B2
(45) Date of Patent: Feb. 1, 2022

(54) GAS TURBINE ENGINE ELECTRICAL GENERATOR

(71) Applicant: ROLLS-ROYCE plc, London (GB)

(72) Inventor: Paul R Davies, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/914,827

(22) Filed: Jun. 29, 2020

(65) Prior Publication Data

US 2021/0079850 A1    Mar. 18, 2021

(30) Foreign Application Priority Data

Jul. 12, 2019   (GB) .................................... 1910009

(51) Int. Cl.
  *F02C 7/36* (2006.01)
  *F02C 7/32* (2006.01)
  *B64D 27/02* (2006.01)

(52) U.S. Cl.
  CPC .................. *F02C 7/36* (2013.01); *F02C 7/32* (2013.01); *B64D 2027/026* (2013.01); *F05D 2220/323* (2013.01); *F05D 2220/76* (2013.01)

(58) Field of Classification Search
  CPC ........ F02C 7/36; F02C 7/32; B64D 2027/026; F05D 2220/76; F05D 2220/323
  See application file for complete search history.

(56) References Cited

U.S. PATENT DOCUMENTS

| | | | |
|---|---|---|---|
| 4,531,357 A | 7/1985 | Weber et al. | |
| 7,061,147 B2 | 6/2006 | Ries | |
| 7,648,278 B2 | 1/2010 | Stout et al. | |
| 7,692,347 B2 | 4/2010 | Nakajima | |
| 10,309,454 B2 | 6/2019 | Takaoka | |
| 10,495,144 B1 | 12/2019 | Ellwood, III et al. | |
| 10,710,734 B2 * | 7/2020 | Sankrithi | ............... B64D 27/24 |
| 10,724,400 B2 | 7/2020 | Ac et al. | |
| 2004/0040312 A1 * | 3/2004 | Hoffjann | ........... H01M 8/04089 60/784 |
| 2006/0137355 A1 | 6/2006 | Welch et al. | |
| 2006/0138888 A1 | 6/2006 | Bouiller et al. | |
| 2008/0001038 A1 * | 1/2008 | Daggett | ................. B64D 27/02 244/53 R |

(Continued)

FOREIGN PATENT DOCUMENTS

| | | |
|---|---|---|
| DE | 10 2010 049885 A1 | 5/2012 |
| DE | 102013209388 A1 | 11/2014 |

(Continued)

OTHER PUBLICATIONS

Search Report of the Intellectual Property Office of the United Kingdom for GB1910010.6 with search date of Jan. 9, 2020.

(Continued)

*Primary Examiner* — Shafiq Mian
(74) *Attorney, Agent, or Firm* — Oliff PLC

(57) ABSTRACT

An aircraft gas turbine engine includes a main engine shaft, a main engine shaft bearing arrangement for rotatably supporting the main engine shaft, and an electric machine including a rotor and a stator. The rotor is mounted to the main engine shaft and is rotatably supported by a further electric machine bearing arrangement extending between the rotor and the stator, and the stator is mounted to static structure of the gas turbine engine.

10 Claims, 9 Drawing Sheets

(56) References Cited

U.S. PATENT DOCUMENTS

| | | | |
|---|---|---|---|
| 2008/0110151 A1 | 5/2008 | Welch et al. | |
| 2008/0148881 A1 | 6/2008 | Moniz et al. | |
| 2008/0166076 A1 | 7/2008 | Stout et al. | |
| 2010/0000226 A1 | 1/2010 | Rensch | |
| 2010/0327588 A1* | 12/2010 | Macchia | F02C 7/32 |
| | | | 290/52 |
| 2011/0154827 A1 | 6/2011 | Ress, Jr. et al. | |
| 2013/0098179 A1 | 4/2013 | Beier et al. | |
| 2014/0026700 A1 | 1/2014 | Beier | |
| 2014/0306460 A1 | 10/2014 | Donnelly | |
| 2015/0308383 A1* | 10/2015 | Hoffjann | H01M 8/24 |
| | | | 60/269 |
| 2015/0311770 A1 | 10/2015 | Goi et al. | |
| 2016/0160867 A1 | 6/2016 | Gehlot | |
| 2017/0141648 A1 | 5/2017 | Chong et al. | |
| 2018/0051701 A1* | 2/2018 | Kupiszewski | H02K 7/083 |
| 2018/0138767 A1* | 5/2018 | Moore | H02K 7/1823 |
| 2018/0372004 A1 | 12/2018 | Alstad et al. | |
| 2019/0048826 A1 | 2/2019 | Pointon et al. | |
| 2019/0101057 A1 | 4/2019 | Stevenson et al. | |
| 2019/0178104 A1 | 6/2019 | Joshi et al. | |
| 2019/0218978 A1 | 7/2019 | Edwards et al. | |
| 2019/0316486 A1 | 10/2019 | Roberge | |

FOREIGN PATENT DOCUMENTS

| | | |
|---|---|---|
| EP | 1939429 A2 | 7/2008 |
| EP | 3511549 A1 | 7/2019 |
| GB | 2 443 743 A | 5/2008 |
| GB | 2 550 397 A | 11/2017 |
| RU | 2168024 C2 | 5/2001 |

OTHER PUBLICATIONS

Search Report of the Intellectual Property Office of the United Kingdom for GB1910011.4 with search date of Dec. 17, 2019.

Search Report of the Intellectual Property Office of the United Kingdom for GB1910008.0 with search date of Jan. 9, 2020.

Search Report of the Intellectual Property Office of the United Kingdom for GB1910009.8 with search date of Jan. 9, 2020.

U.S. Appl. No. 16/914,867, filed Jun. 29, 2020 in the name of Paul R. Davies.

U.S. Appl. No. 16/914,911, filed Jun. 29, 2020 in the name of Jonathan P. Bradley.

U.S. Appl. No. 16/915,032, filed Jun. 29, 2020 in the name of Jonathan P. Bradley.

Dec. 8, 2020 Extended Search Report issued in European Patent Application No. 20180138.8.

Dec. 8, 2020 Extended Search Report issued in European Patent Application No. 20180140.4.

Dec. 8, 2020 Extended Search Report issued in European Patent Application No. 20180139.6.

Dec. 8, 2020 Extended Search Report issued in European Patent Application No. 20180137.0.

Aug. 9, 2021 Office Action issued in U.S. Appl. No. 16/915,032.

Sep. 17, 2021 Office Action Issued in U.S. Appl. No. 16/915,032.

Nov. 10, 2021 Notice of Allowance issued in U.S. Appl. No. 16/914,911.

Nov. 8, 2021 Notice of Allowance issued in U.S. Appl. No. 16/915,032.

* cited by examiner

GAS TURBINE ENGINE ELECTRICAL GENERATOR

CROSS-REFERENCE TO RELATED APPLICATIONS

This application claims the benefit of United Kingdom Patent Application No. 1910009.8 filed Jul. 12, 2019, the disclosure of which is herein incorporated by reference in its entirety.

TECHNICAL FIELD

The present disclosure relates to electric machines of gas turbine engines, and gas turbines comprising electrical machines.

BACKGROUND

Aircraft gas turbine engines provide both propulsive and electric power for aircraft. Consequently, such engines comprise electric machines such as generators for providing electric power. Further electric machines in the form of motors configured to drive fluid pumps such as oil and fuel pumps may also be provided. The function of the generators and motors can be combined, such that, for instance, a generator may operate as a starter motor during starting.

As electrical power demands increase, and electrical motors are increasingly used to replace hydraulic and pneumatic motors in aircraft, the size of electric machines on aircraft is steadily increasing relative to the size of the gas turbine engines. Consequently, packaging of such machines within the limited space available is becoming increasingly difficult.

A conventional packaging arrangement for an electric machine for a gas turbine engine is shown in FIG. 1. A gas turbine engine 1 comprises a main engine compressor shaft 2, which rotates when the engine is in operation. This is coupled to an offtake shaft 3 via bevel gears 4. The offtake shaft 3 is in turn coupled to an angle drive shaft 5 through a second set of bevel gears 6. An electric machine 7 is coupled to the angle drive shaft 5. Such an arrangement is heavy, complex, and inefficient, in view of the gearing.

Alternative arrangements have also been proposed, including so-called "embedded generators", in which an electric machine is installed within an annular space radially inward of a compressor. Such an arrangement provides for efficient packaging, but presents other difficulties.

The present invention seeks to provide an improved gas turbine engine having an embedded electric machine.

SUMMARY

According to a first aspect there is provided an aircraft gas turbine engine comprising: a main engine shaft; a main engine shaft bearing arrangement configured to rotatably support the main engine shaft; and an electric machine comprising a rotor and a stator; wherein the rotor is mounted to the main engine shaft and is rotatably supported by a further electric machine bearing arrangement extending between the rotor and the stator, and the stator is mounted to static structure of the gas turbine engine.

Consequently, the machine rotor is supported by separate bearings to the main engine shaft. Consequently, the rotor is mounted to the stator by dedicated bearings, ensuring that accurate control can be maintained over the rotor/stator air gap. Furthermore, as the electric machine (comprising the rotor and stator) is self-contained, with its own bearings controlling the rotor stator gap, the electric machine can be removed and installed in the gas turbine engine without special tooling to ensure the correct gap during installation and removal. A still further advantage is that the rotor dynamics of the electric machine are independent of the main gas turbine engine shaft. Consequently, the electric machine may be added to an existing gas turbine engine design without significantly affecting engine balance and other rotor dynamics properties, such as resonance.

The stator of the electric machine may be cantilevered from the static structure of the gas turbine engine. Consequently, a strong but flexible structure is provided to mount the stator, which allows for relative movement of the casing in use.

The electric machine stator may be mounted by a mount member extending generally rearward or forward from the gas turbine engine static structure to the electric machine stator. Alternatively, the machine stator may be mounted by a mount member extending generally forward from a gas turbine engine static structure.

The mount member may be flexible and may have a higher flexibility than the further bearing arrangement. It has been found that, in many cases, significant loads are encountered by the electric machine rotor in flight, which may result in relative movement between the main engine shaft and static engine structure. In order to minimise the loads on the electric machine bearings, and to maintain the air gap, a flexible stator mounting is provided. This relieves the loads, while allowing movement of the main engine shafts, and maintains an accurate air gap in use.

The main engine shaft may comprise a radially inner portion joined to a radially outer portion separated by an annular space. The electric machine rotor may be mounted to the radially outer portion of the main engine shaft.

The radially outer portion may comprise a flexible bellows arrangement configured to permit movement between the radially inner and radially outer main engine shaft portions in use. The flexible bellows arrangement may comprise a lower stiffness relative to the stator mount member. Advantageously, the stator can be relatively stiffly mounted, with movement of the shaft being accommodated by the flexible bellows arrangement. A further advantage is that any vibrations imparted by the electric machine can be further isolated from the main engine shaft by providing flexibility between the electric machine rotor mounting and the remainder of the main engine shaft.

Alternatively, the electric machine rotor may be directly mounted to an external surface of the main engine shaft.

The electric machine bearing arrangement may comprise a first bearing and a second bearing. The first bearing may comprise a radial load bearing and the second bearing may comprise a thrust bearing.

The first bearing may be provided at an axially rearward end of the electric machine rotor, and the second bearing may be provided at an axially forward end of the electric machine rotor. Advantageously, the electric machine rotor is held rearward and forward, to minimise whirl in use, in order to maintain a minimal rotor-stator air gap in use, and to prevent contact between the rotor and stator.

The electric machine bearing arrangement may comprise one or more roller bearings, and may comprise one or more ball bearings.

The electric machine may comprise an electric motor configured to provide motive power to start the gas turbine engine in a starting mode, and may comprise a generator configured to generate electrical power when in a running mode.

The electric machine may comprise a radial flux electric machine. The stator may be provided radially outward of the rotor.

The electric machine may comprise a permanent magnet electric machine. Permanent magnet machines have a high power density, and so enable still further reductions in weight, and increased packaging efficiency.

The main gas turbine engine shaft may be arranged to couple a turbine to a compressor to form a spool. The spool may further comprise one or more compressor or turbine drive arms, and may comprise one or more compressor or turbine discs. The drive arms may be configured to couple one or more discs to the shaft.

The gas turbine engine may comprise a high pressure spool comprising a high pressure compressor coupled to a high pressure turbine by a high pressure shaft.

The gas turbine engine may comprise a low pressure spool comprising a low pressure compressor coupled to a low pressure turbine by a low pressure shaft.

The electric machine rotor may be coupled to one of the high pressure shaft and the low pressure shaft.

The low and high pressure shafts may be coaxial, and the low pressure shaft may be provided radially inward of the high pressure shaft along at least part of its length.

The gas turbine engine may comprise a fan coupled to a main engine spool.

The low pressure compressor may be located axially forwardly of the high pressure compressor.

The electric machine may be located forward of the high pressure compressor, and may be located rearward of the low pressure compressor.

Arrangements of the present disclosure may be particularly, although not exclusively, beneficial for fans that are driven via a gearbox. Accordingly, the gas turbine engine may comprise a gearbox that receives an input from one or more main engine shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed). The electric machine may be located axially between the gearbox and the low pressure compressor. Alternatively, the electric machine rotor may be mounted to one of the rotating components of the gearbox.

The gas turbine engine as described and/or claimed herein may have any suitable general architecture. For example, the gas turbine engine may have any desired number of shafts that connect turbines and compressors, for example one, two or three shafts.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Figure 1:
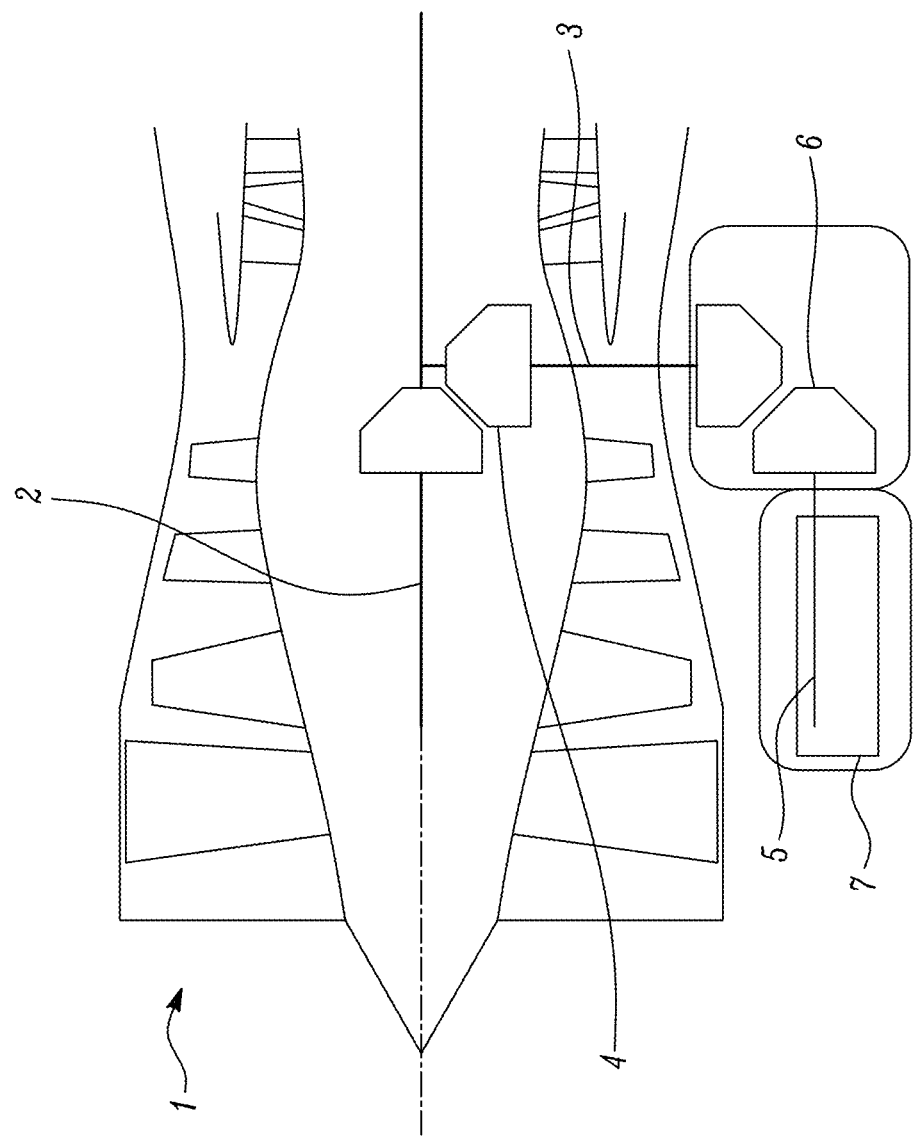
FIG. 1 is a sectional side view of a prior gas turbine engine.
Figure 2:
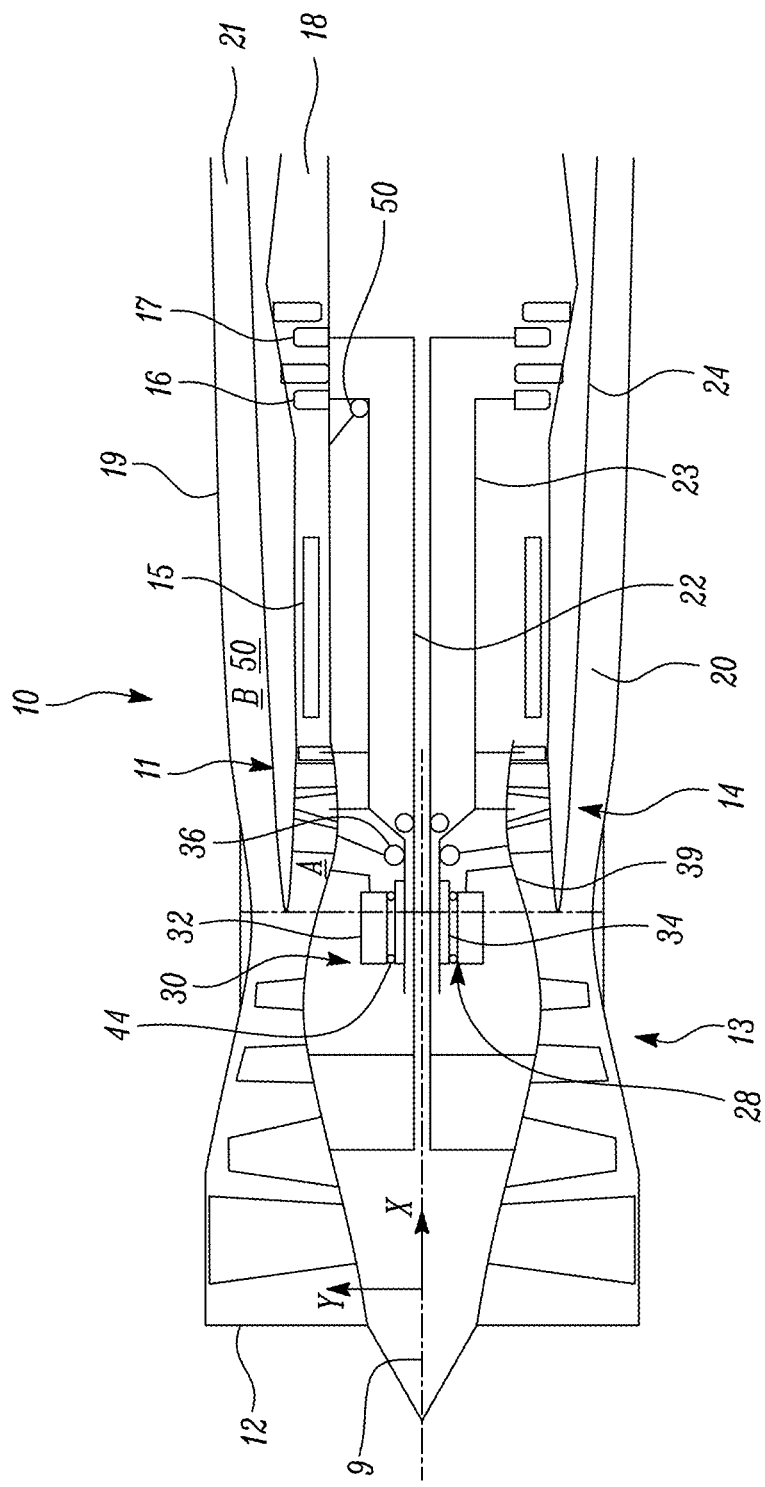
FIG. 2 is a sectional side view of a first gas turbine engine in accordance with the present disclosure.

FIG. 2 illustrates a gas turbine engine in the form of a low bypass turbofan 10 having a principal rotational axis 9. The rotational axis 9 defines a rearward direction X generally parallel with airflow through the engine 10, a forward direction opposite the rearward direction, and a radial direction Y. The engine 10 comprises an air intake 12 and a propulsive fan/low pressure compressor 13 that generates two airflows: a core airflow A and a bypass airflow B. The gas turbine engine 10 comprises a core 11 that receives the core airflow A. The engine core 11 comprises, in axial flow series, a high pressure compressor 14, combustion equipment 15, a high-pressure turbine 16, a low pressure turbine 17 and a core exhaust nozzle 18. A nacelle 19 surrounds the gas turbine engine 10 and defines a bypass duct 20 and a bypass exhaust nozzle 21. The bypass airflow B flows through the bypass duct 50, which is bounded by a radially inner wall in the form of a core nacelle 24. The fan 13 is attached to and driven by the low pressure turbine 17 via a low pressure shaft 22. The high pressure compressor 14 is coupled to the high pressure turbine 16 by a high pressure shaft 23.

In use, the core airflow A is accelerated and compressed by the high pressure compressor 14 and directed into the combustion equipment 15 where it is mixed with fuel and the mixture is combusted. The resultant hot combustion products then expand through, and thereby drive, the high pressure and low pressure turbines 16, 17 before being exhausted through the nozzle 18 to provide some propulsive thrust. The high pressure turbine 16 drives the high pressure compressor 14 by a high pressure shaft 13. The fan 13 is in the form of a high pressure, low bypass ratio, multi-stage fan, and provides approximately half the thrust. In view of the high pressure ratio of the fan 13, the fan 13 can be regarded as a further, low pressure compressor.

The engine can be divided into one or more "spools". Each spool comprises a plurality of rotating components, which rotate together in unison, at the same speed. For instance, in the present disclosure, two spools are provided—a high pressure spool and a low pressure spool. The high pressure spool comprises at least the high pressure compressor 14, high pressure turbine 16, and interconnecting high pressure shaft 23, along with other components that rotate with these components about the main engine axis 9. Similarly, the low pressure spool comprises at least the low pressure compressor/fan 13, low pressure turbine 17, and interconnecting low pressure shaft 22, along with other components that rotate with these components about the main engine axis 9.

The gas turbine engine comprises an electric machine arrangement, which is configured to produce electrical power, and/or provide motive power to start the engine. The electric machine arrangement comprises a starter generator 30, which comprises an electric machine stator 32 and an electric machine rotor 34 separated by a radial air gap 52. The electric machine rotor 34 is coupled to the high pressure shaft 23, while the stator 32 is coupled to static structure. The electric machine 30 is provided forward of the high pressure compressor 14, and rearward of the low pressure compressor/fan 13, in an annular space provided within the core of the engine, radially inward of the core gas flow path.

Figure 3:
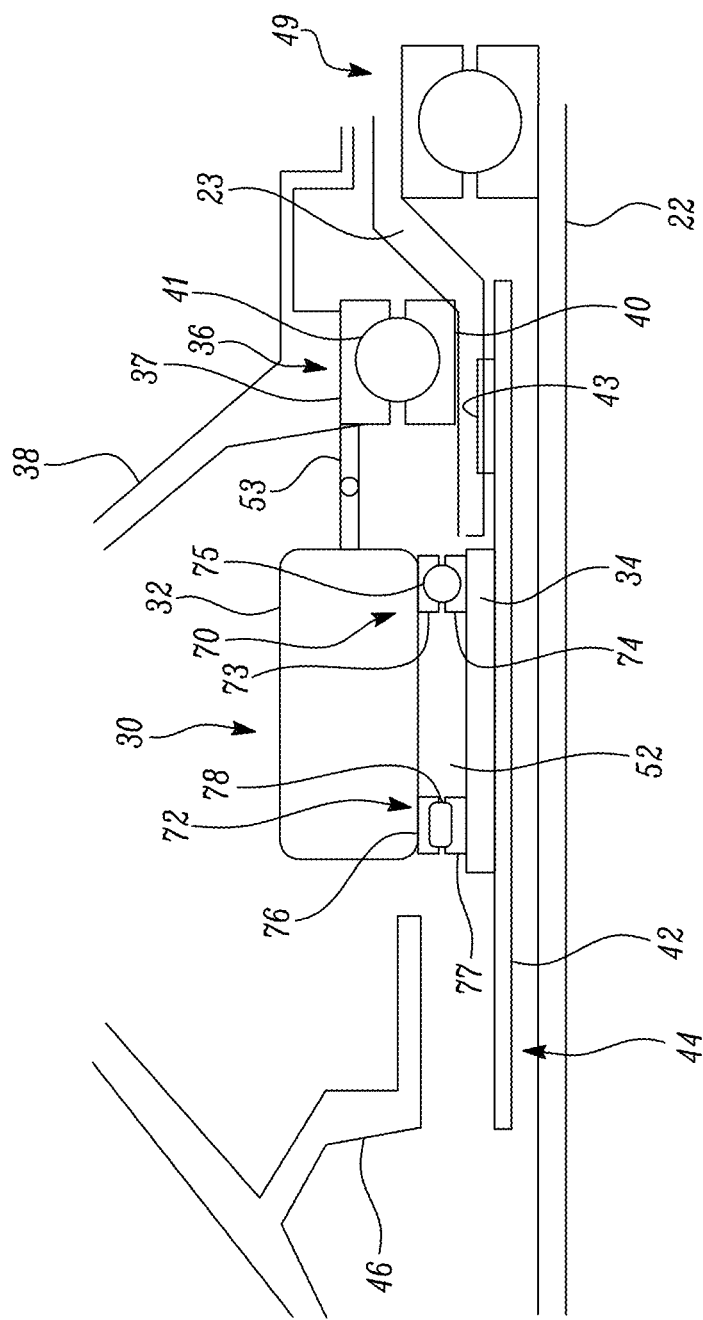
FIG. 3 is a sectional side view of part of the gas turbine engine of FIG. 2.

Referring now to FIGS. 2 and 3, the high pressure shaft 23 is rotatably supported relative to engine static structure by a main engine shaft bearing system. The main bearing system comprises a first main shaft bearing 36, which supports a central portion of the high pressure shaft 23. The first main shaft bearing 36 is located forward of the high pressure compressor 14, and rearward from the electric machine stator 32 and rotor 34. The first main shaft bearing comprises a radially outer race 37 which is mounted to a static component such as a radially extending mount arm 38, which extends from an engine core housing 39. The main shaft bearing 36 further comprises a radially inner race 40, which is mounted to the high pressure shaft 23. A plurality of rollers 41 are provided therebetween, to allow for rotational movement of the shaft 23. Further main shaft bearings are provided, including an inter-shaft bearing 49, which extends between the high and low pressure shafts 22, 23, and a rear bearing 50, which supports a rear end of the high pressure shaft.

The high pressure shaft 23 may comprise multiple parts, and in this case, includes a lay shaft 42, which extends forward of the first bearing 36, and is joined to the remainder of the shaft 23 by a spline 43. The lay shaft 42 is supported at a forward end by a second bearing 44. The lay shaft 42 is provided radially inward of the remainder of the shaft 23.

The engine also comprises a further electric machine bearing arrangement, which is configured to rotatably support the electric machine rotor 34 relative to the stator 32, independently of the main engine shaft bearings 36.

The electric machine bearing arrangement is shown in FIG. 3, and comprises a first electric machine bearing 70, and a second electric machine bearing 72. Each bearing 70, 72 is provided adjacent an axial end of the electric machine, with the first bearing 70 being adjacent an axially rearward end, and the second bearing 72 being provided adjacent an axially forward end. In other embodiments, a single bearing at one end could be provided, or both bearings could be provided at a single end.

The or each machine bearing 70, 72 extends between the stator 32 and rotor 34, and acts to allow rotation of the rotor 34, while maintaining the air gap 52. Consequently, the bearings 70, 72 define a relatively high stiffness in a radial direction, to maintain the rotor 34 about a consistent rotational axis, and to maintain a consistent air gap between the rotor 34 and stator 32.

The first machine bearing 70 comprises a thrust bearing, configured to accommodate both radial and axial loads, and is in the form of a roller bearing comprising a radially outer race 73 which is mounted to the stator 32, a radially inner race 74, which is mounted to the rotor 34, and a plurality of rollers 75 therebetween, to allow for rotational movement of the rotor 34.

Similarly, the second machine bearing 72 comprises a radial load roller bearing, configured to primarily accommodate both radial while allowing some axial movement, to allow for thermal expansion. The second bearing 72 is in the form of a roller bearing comprising a radially outer race 76 which is mounted to the stator 32, a radially inner race 77, which is mounted to the rotor 34, and a plurality of rollers 78 therebetween, to allow for rotational movement of the rotor 34. The rollers 78 are in the form of cylindrical rollers. In view of the provision of electric machine bearings 70, 72 that are separate to the main shaft bearings 36, 49, 50, a load path is defined between the rotor 34 and stator 32, which extends directly from the rotor 34 to the stator 32, to the static mounting, rather than through the main shaft bearings 36, 49, 50. Consequently, the main engine shaft is centred on separate bearings to the electric machine, such that each can rotate about slightly separate axes, without compromising either shaft dynamics, or rotor-stator air gap integrity.

The machine 30 is in the form of a permanent magnet, radial flux electric machine. The rotor 34 comprises a plurality of permanent magnets (not shown), which are attached to a radially outer surface of the rotor 34. It will be understood however that the permanent magnet rotor could be replaced by another suitable type, such as an inductance rotor or switched reluctance rotor. Each stator 32 comprises a plurality of electric windings 37 which can be energised with electrical current to enable the machine to act as a motor, or will be energised by interaction with the rotating magnetic field of the rotor 34 to act as a generator.

The stator 32 of the electric machine 30 is mounted to a static component such part of an engine housing 38 via an axially forward extending stator mount arm 53. Typically, the stator 32 is cantilevered, i.e. is supported at one end only (in this embodiment, the forward end), with the other end being free, to allow for some radial and angular flexing in use. The stator mount arm 53 is designed to be sufficiently stiff to react loads caused by interaction of the stator 32 and rotor 34 in use. However, the stator mount arm is designed to have flexibility in the radial direction, typically in the form of elastic bending flexibility. The stator mount arm 53 is typically more flexible than the electric machine bearings 70, 72. Consequently, a radial force applied to the electric machine rotor 34 results in a greater flexing of the stator mount arm 53 than of the bearings 70, 72. Consequently, movement or loads applied to the main engine shaft 23 result in a relatively small radial movement of the rotor 34 relative to the stator 32 (since the rotor is supported by the stator via the relatively stiff bearings 70, 72), but a relatively large movement of the stator 32 (since the stator is supported by the relatively flexible stator mount arm 53).

In view of the above arrangement, a relatively small air gap 52 can be maintained within the machine in spite of backbone flexing or shaft movement during, for instance, maneuvering loads in flight. Consequently, a relatively small clearance can be provided between the rotor 34 and stator 32, which results in a small risk of contact between the rotor 34 and stator 32, while allowing for high energy density, and high efficiency.

Figure 4:
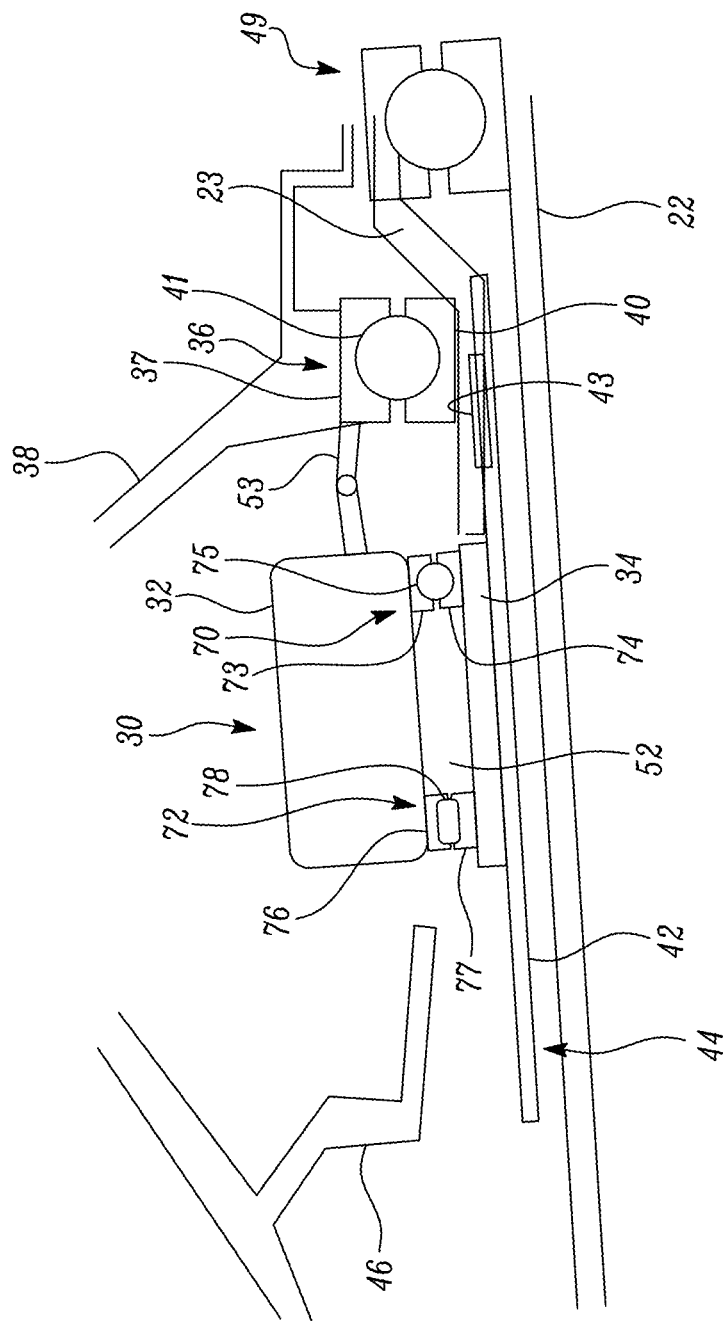
FIG. 4 is a view of the part of the gas turbine engine shown in FIG. 3, in a loaded condition.

This can be seen from a comparison between FIGS. 3 and 4. In FIG. 3, the engine is shown under low or no load, in which the shaft 23 is in a nominal, no-load position. On the other hand, in FIG. 4, the shaft 23 is angled downwardly, and the fixed structure is angled upwardly in view of backbone bending and high shaft loads. As will be appreciated, the movements are exaggerated for clarity.

Since the rotor 34 is attached to the shaft 23, the rotor 34 remains parallel with the shaft 23. In view of the relatively stiff machine bearings 70, 72, the stator 32 is also angled to remain parallel to the rotor 34, and so the air gap 52 is maintained as substantially the same as in the no-load position. In view of the relatively flexible mount arm 53, the mount arm 53 bends, allowing the stator 32 to maintain its relative position with the rotor 34.

Figure 5:
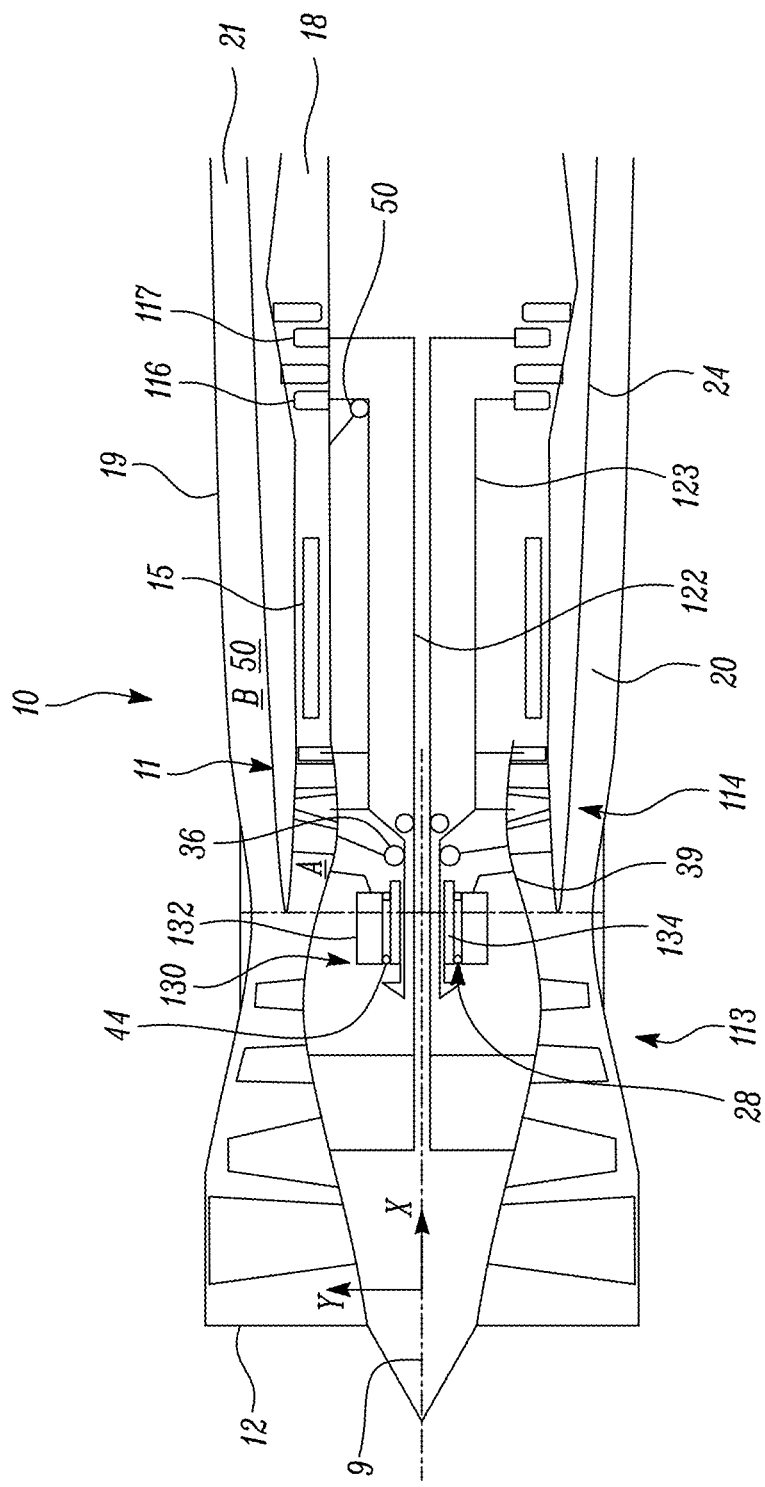
FIG. 5 is a sectional side view of a second gas turbine engine in accordance with the present disclosure.

FIG. 5 shows a second gas turbine engine 110, which is similar to the engine 10, and so only differences therebetween will be described in detail.

The engine 110 has an architecture similar to the engine 10, having two spools: a high pressure spool and a low pressure spool, each comprising respective compressors 114, 113, turbines 116, 117, and shafts 123, 122. The engine 110 also comprises an electric machine 130 comprising a stator 132 and rotor 134.

However, the electric machine stator 132 and rotor 134 are mounted differently to their equivalents 32, 34 of the first embodiment.

Figure 6:
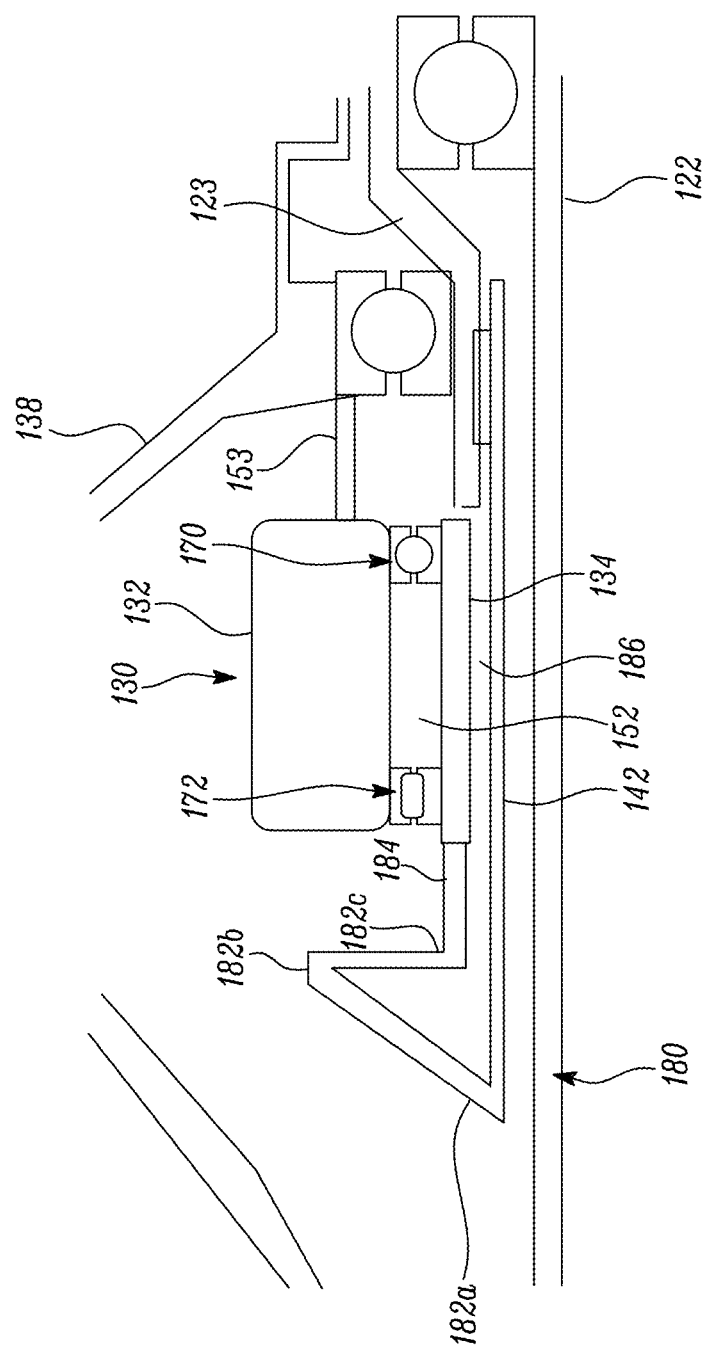
FIG. 6 is a sectional side view of part of the gas turbine engine of FIG. 5.

FIG. 6 shows the electric machine 30 in more detail. The electric machine rotor 134 is again mounted to the low pressure shaft 123 via a lay shaft 142, which connects to a mount arm 184. The lay shaft 142 extends from a position axially forward of the rotor 134 from the remainder of the shaft 123 in a generally axial direction radially inwardly of the rotor 134, to a location axially rearward of the rotor 134. The lay shaft 142 comprises a flexible bellows arrangement 180, which allows for movement of the rotor 134 relative to the remainder of the shaft 123. The lay shaft 142 comprises a plurality of sharp bends 182a, 182b, 182c, which in combination allow for bending of the lay shaft, to allow for overall radial movement of the lay shaft 142. As will be understood, the required flexibility could be provided for in other ways, such as by the use of highly flexible materials, such as elastomeric materials, or an articulating mechanism such as a crowned spline. Consequently, in some cases, the flexibility is non-elastic, i.e. a deflection does not result in a significant restoring force.

The lay shaft 142 is coupled to the mount arm 184, which extends forwardly from the lay shaft 142, to the rotor 134. Consequently, the lay shaft 142 defines a radially inner portion of the main engine shaft 123, while the mount arm 18 defines a radially outer portion of the main engine shaft 123. The lay shaft 142 and mount arm 184 extend forwardly, radially inwardly of the rotor 134, then rearwardly to the rotor 134. A gap 186 is provided between the rotor 134 and the lay shaft 142 where it extends radially inwardly of the rotor 134, to allow for radial movement of the rotor 134.

The stator 132 is also mounted differently to the stator 32 of the first embodiment. The stator 132 is again mounted to static structure 138 via a mount arm 153. However, in this case, the mount arm 153 is relatively stiff in a radial direction, i.e. is configured to bend relatively little in response to a load. In particular, the mount arm 153 has a higher bending stiffness than the lay shaft 142 and mounting arm 184 on which the rotor 134 is mounted.

The rotor 134 is again mounted to the stator by first and second bearings 170, 172, which are similar to the bearings 70, 72 of the first embodiment, and are generally stiff, having a higher stiffness in a radial direction than the lay shaft 142 and mounting arm 184, and possibly a similar or higher stiffness than the stator mount arm 153. An air gap 152 is defined between the rotor 134 and stator 132.

Figure 7:
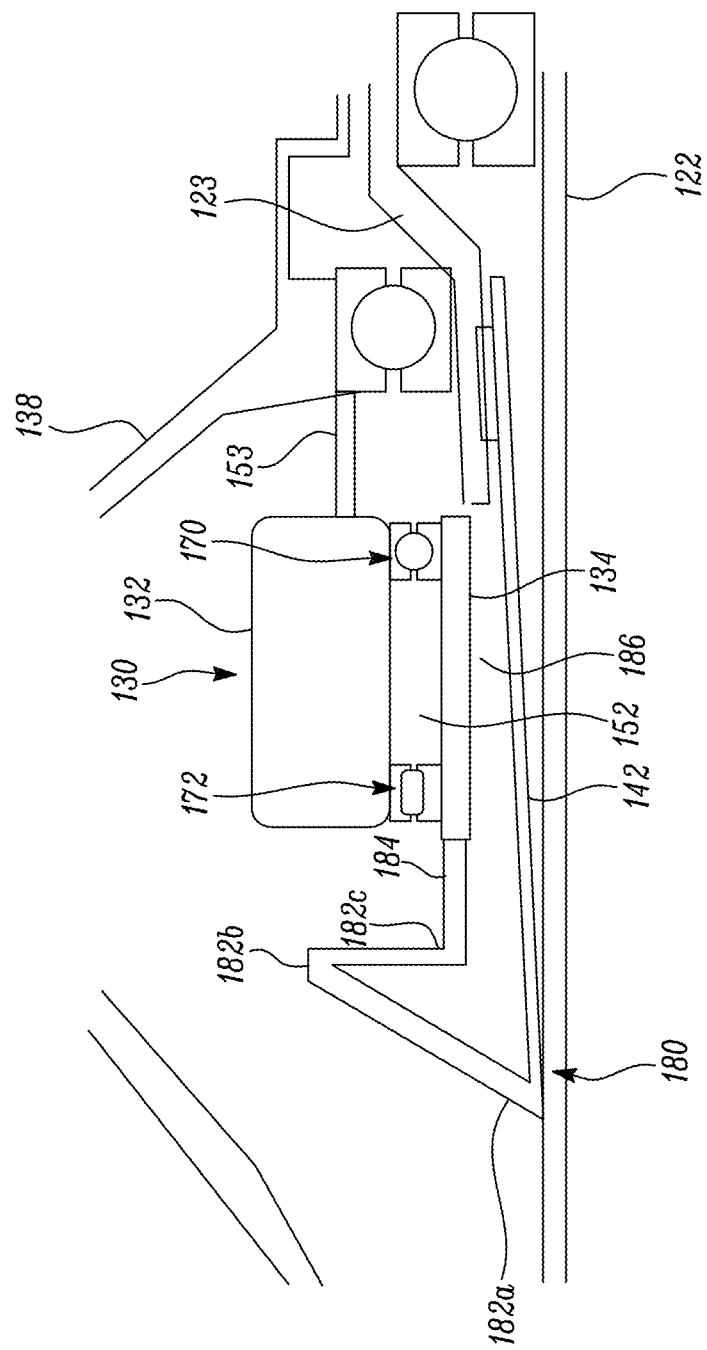
FIG. 7 is a view of the part of the gas turbine engine shown in FIG. 6, in a loaded condition

Consequently, the mounting system of the arrangement shown in FIGS. 5 to 7 reacts differently to loads in use, compared to the system shown in FIGS. 2 to 4. This can be seen from a comparison between FIGS. 6 and 7. In FIG. 6, the engine is shown under low or no load, in which the shaft 23 is in a nominal, no-load position. On the other hand, in FIG. 7, the shaft 123 is angled downwardly, in view of high shaft loads. As will be appreciated, the movements are exaggerated for clarity.

As can be seen, the bends 182a, 182b change their respective angles, such that the rotor 134 remains parallel to the engine longitudinal axis in spite of movement of the high pressure shaft 123. Meanwhile, the rotor 134 and stator 132 remain parallel, to maintain a consistent air gap 152, since the stator mount arm 153 and bearings 170, 172 do not bend to a significant extent, or at least to a lesser extent than the lay shaft 142. The annular gap 186 between the lay shaft 142 and rotor 134 allows for this movement. Advantageously, the whole electric machine 130 (i.e. both the stator 132 and rotor 134) are to some extent isolated from the main engine shaft 123. Consequently, the electric machine 130 can be balanced separately to the main engine shaft 123, and vibrations from either system are generally not transmitted to the other. Furthermore, it has been found that, where flexibility is provided in the stator mounting rather than the rotor mounting, excessive movement may result due to the large degree of flexibility required of a flexible stator mounting, in view of the inertia of the stator 132.

Optionally, the mount arm 153 may be fusible, that is, may be configured to break under a predetermined load. Consequently, in the event of an electric machine 130 failure, the failure is prevented from propagating the main engine shaft. In particular, where the electric machine 130 is a permanent magnet machine, it may be desirable to "declutch" the rotor 134 from the main engine shaft 123 in the event of, for example, a winding failure such as a short circuit. In such a case, an actuator may be provided to deliberately break or otherwise disconnect the mount arm 153 from the remainder of the main engine shaft 123.

Figure 8:
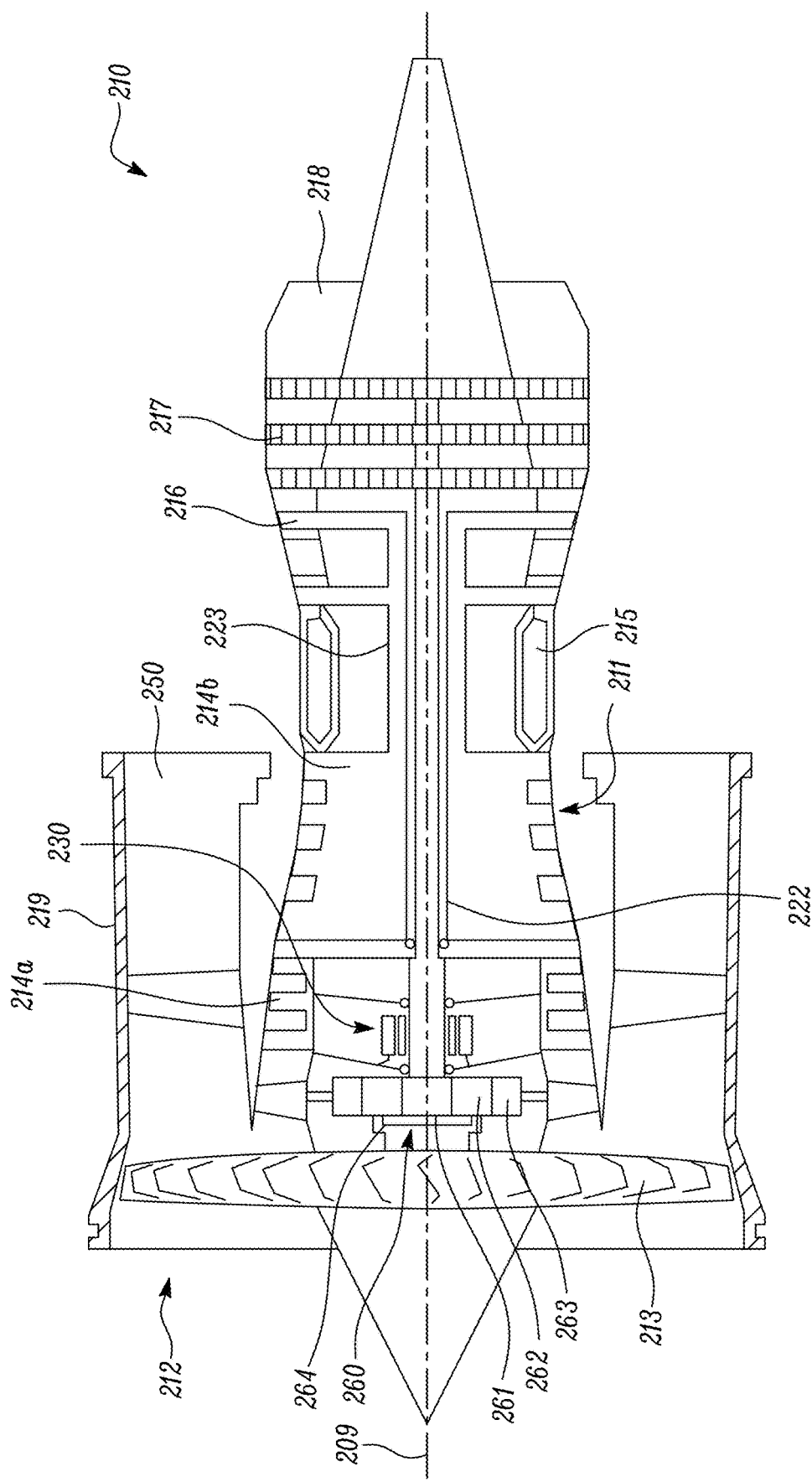
FIG. 8 is a sectional side view of a third gas turbine engine in accordance with the present disclosure.

FIG. 8 shows a third gas turbine engine 210 in the form of a geared, high bypass ratio gas turbine engine 210. The engine 210 comprises an air intake 212 and a propulsive fan 213 that generates two airflows: a core airflow A and a bypass airflow B. The fan 213 differs from the fan 13, in that only a single, low pressure stage is provided. However the fan 213 has a much larger diameter compared to the core 211, and so defines a high bypass ratio. The gas turbine engine 210 comprises a core 211 that receives the core airflow A. The engine core 211 comprises, in axial flow series, a low pressure compressor 214a, a high pressure compressor 214b, combustion equipment 215, a high-pressure turbine 216, a low pressure turbine 217 and a core exhaust nozzle 218. A nacelle 219 surrounds the gas turbine engine 210 and defines a bypass duct 250. The bypass airflow B flows through the bypass duct 250, which is bounded by a radially inner wall in the form of a core nacelle 224. The fan 213 is attached to and driven by the low pressure turbine 217 via a low pressure shaft 222 and reduction gearbox 260. The low pressure turbine also drives the low pressure compressor 214a. The high pressure compressor 214b is coupled to the high pressure turbine 216 by a high pressure shaft 223. The shafts 222, 223 rotate about a longitudinal axis 219. Together, the high pressure turbine, shaft and compressor 216, 214b, 223 form a high pressure spool, and the low pressure turbine 217, shaft 222, compressor 214a, gearbox 260 and fan 213 together form a low pressure spool.

The low pressure turbine 217 drives the low pressure shaft 222, which is coupled to a sun gear 261 of the gearbox 260. The sun gear meshes with a plurality of planet gears 262, which in turn mesh with a ring gear 263. The planet gears are mounted to a planet carrier 264, which is in turn mounted to the fan 213 to thereby turn the fan at a reduced speed compared to the low pressure turbine 217.

Figure 9:
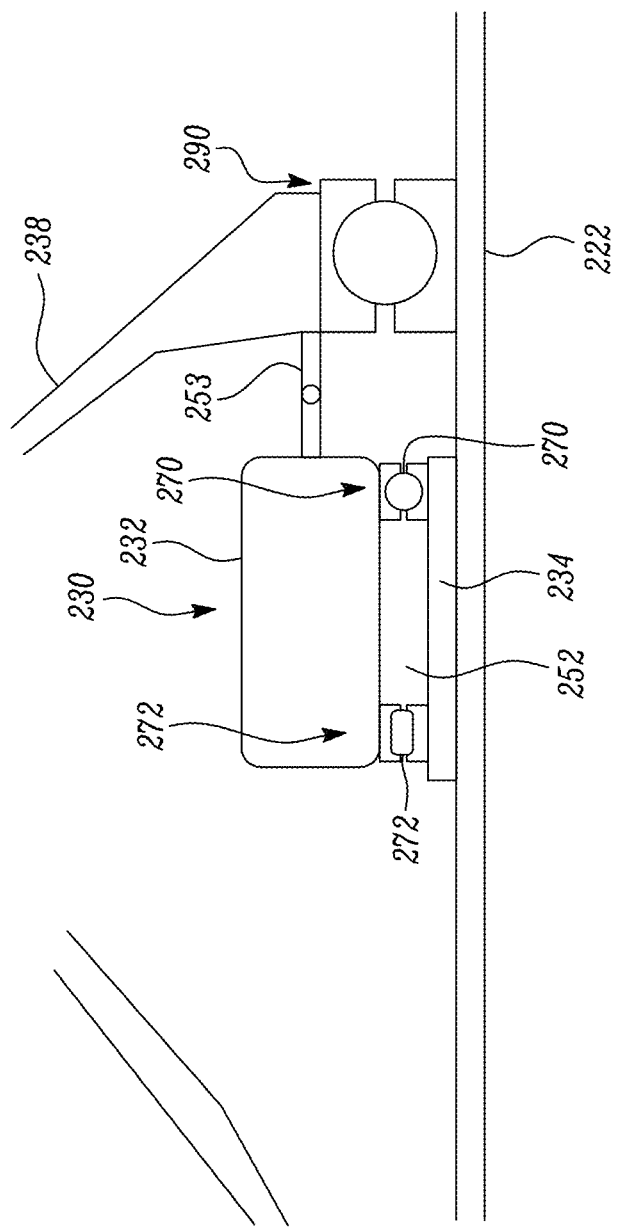
FIG. 9 sectional side view of part of the gas turbine engine of FIG. 8.

The gas turbine engine 210 additionally comprises an electric machine arrangement, which is configured to produce electrical power, and/or provide motive power to start the engine and is shown in FIG. 9. The electric machine arrangement is similar to the arrangement of the first embodiment, and again comprises starter generator 230, which comprises an electric machine stator 232 and an electric machine rotor 234. The electric machine differs from the previous embodiment, in that the electric machine rotor 234 is coupled to the low pressure shaft 222 in this example, on the input side of the gearbox 260. The electric machine arrangement also differs from the first embodiment, in that the stator 232 and rotor 234 are provided in a space within the core 211 axially between the low pressure compressor 214a and the gearbox 240.

Again, the stator 232 is mounted to static structure 238 via an axially, forward extending stator mount arm 253. The rotor 234 is directly mounted to the low pressure shaft 222, and is supported by a machine bearing system comprising first and second bearings 270, 272, which are similar to the bearings 70, 72 and which support the rotor 234 and maintain an air gap 252 between the rotor 234 and stator 232. Again, a main shaft bearing system is provided, while includes a plurality of roller bearings including a forward bearing 290, which supports the low pressure shaft 222 relative to static structure.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 8 has a split flow nozzle meaning that the flow through the bypass duct has its own nozzle that is separate to and radially outside the core engine nozzle 218. However, this is not limiting, and any aspect of the present disclosure may also apply to engines in which the flow through the bypass duct and the flow through the core are mixed, or combined, before (or upstream of) a single nozzle, which may be referred to as a mixed flow nozzle. One or both nozzles (whether mixed or split flow) may have a fixed or variable area.

Similarly, features of the different embodiments could be combined. For instance, the stator and rotor mounting arrangement of FIGS. 5 to 7 could be used in the gas turbine of FIG. 8. The electric machine of FIG. 8 could be provided between the high and low pressure compressors. The high bypass engine of FIG. 8 could comprise a direct drive fan similar to that of FIGS. 2 to 7, with the low pressure shaft driving both the low pressure compressor and fan, or separate shafts driving the low pressure compressor and fan independently, in a three-shaft configuration.

Similarly, different types of bearings could be provided. For instance, one or more electromagnetic, pneumatic or hydraulic bearings could replace one or more roller bearings.

Different types of electric machines could be used. For example, hybrid axial/radial flux machines could be used. The stator could be provided radially inward of the rotor. The permanent magnet machine could be replaced with any of a wound field machine, an induction machine, and a switched reluctance machine. The machines could be coupled to the high pressure shaft, or could be coupled to the low pressure shaft after the gearbox (i.e. at the output side of the gearbox, where the speed is reduced).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A gas turbine engine for an aircraft, the gas turbine engine comprising:
   a main engine shaft comprising a radially inner portion joined to a radially outer portion separated by an annular space;
   a main engine shaft bearing arrangement configured to rotatably support the main engine shaft; and
   an electric machine comprising a rotor and a stator;
   wherein:
   the rotor is mounted to the radially outer portion of the main engine shaft and is rotatably supported by an electric machine bearing arrangement extending between the rotor and the stator,
   the stator is mounted to a static structure of the gas turbine engine by a stator mount member extending rearward or forward from the static structure to the stator,
   the radially outer portion comprises a flexible bellows arrangement configured to permit movement between the radially inner portion and the radially outer portion of the main engine shaft in use, and
   the flexible bellows arrangement comprises a lower stiffness relative to the stator mount member.

2. The gas turbine engine according to claim 1, wherein the stator of the electric machine is cantilevered from the static structure of the gas turbine engine.

3. The gas turbine engine according to claim 1, wherein the stator mount member is flexible and may have a higher flexibility than the electric machine bearing arrangement.

4. The gas turbine engine according to claim 1, wherein the electric machine bearing arrangement comprises a first bearing and a second bearing, wherein the first bearing comprises a radial load bearing and the second bearing comprises a thrust bearing.

5. The gas turbine engine according to claim 1, wherein the electric machine comprises a radial flux electric machine.

6. The gas turbine engine according to claim 1, wherein the electric machine comprises a permanent magnet electric machine.

7. The gas turbine engine according to claim 1, wherein the main engine shaft is arranged to couple a turbine to a compressor to form a spool.

8. The gas turbine engine according to claim 7, wherein:
   the main engine shaft includes a high pressure shaft and a low pressure shaft, and the gas turbine engine comprises a high pressure spool comprising a high pressure compressor coupled to a high pressure turbine by the high pressure shaft, and a low pressure spool comprising a low pressure compressor coupled to a low pressure turbine by the low pressure shaft.

9. The gas turbine engine according to claim 8, wherein the rotor of the electric machine is coupled to one of the high pressure shaft and the low pressure shaft.

10. The gas turbine engine according to claim 8, wherein the low and high pressure shafts are coaxial, and the low pressure shaft is provided radially inward of the high pressure shaft along at least part of a length of the low pressure shaft.

* * * * *